May 3, 1932. P. H. WILKINSON ET AL 1,857,104
BRAKE
Filed Aug. 28, 1929 2 Sheets-Sheet 1

INVENTORS
P. H. WILKINSON
F. GEBHART
BY Hazard and Miller
ATTORNEYS

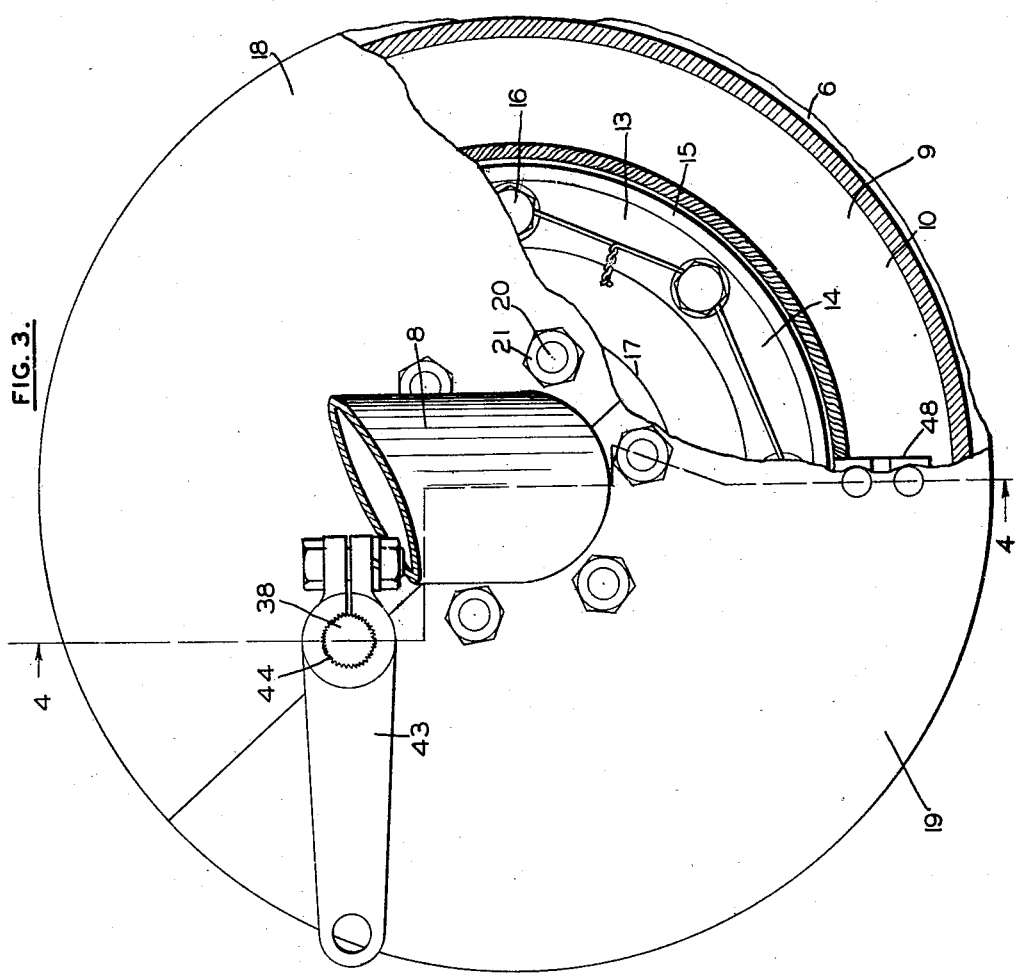
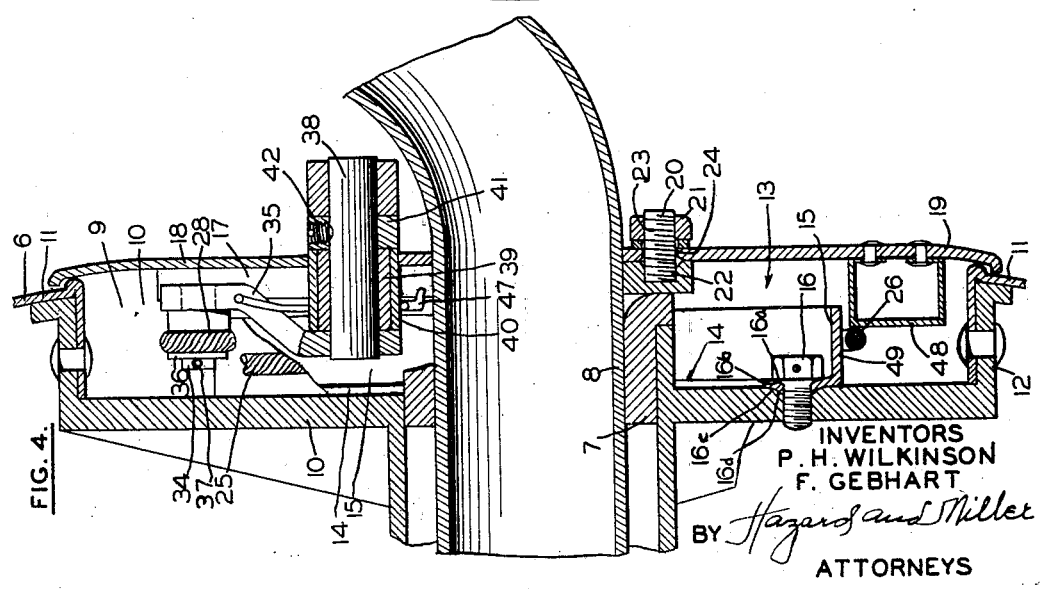

Patented May 3, 1932

1,857,104

UNITED STATES PATENT OFFICE

PAUL H. WILKINSON AND FREDERICK GEBHART, OF LOS ANGELES, CALIFORNIA; SAID GEBHART ASSIGNOR TO SAID WILKINSON

BRAKE

Application filed August 28, 1929. Serial No. 388,967.

This invention relates to braking mechanisms, and has for an object the provision of a braking mechanism of novel and efficient characteristics, and which, while being capable of practically universal application to develop friction resistance to the rotation of one machine element in respect to another, is particularly applicable for use upon the landing gear of airplanes.

A more detailed object is the provision of a braking mechanism of such a nature that it is adapted to develop an equalized concentric pressure through the expedient of a cable wound with one or more full turns upon a brake drum, means being provided for varying the pressure of the cable against the drum.

A further object is the provision of a braking mechanism of the general character described, which is of exceedingly compact and rugged construction, with the result that it lends itself to installation upon the landing gear of airplanes of various sizes and types. Furthermore, the design results in the provision of an efficient braking mechanism which is unusually light in weight, which is one of the primary considerations in airplane construction.

A further object is the provision of a braking mechanism as described, which may be lubricated. The lubrication of those portions of the mechanism between which friction is developed, results in a smoothly acting, noiseless, and positive brake.

Other advantages resulting from the improved construction of the braking mechanism of the present invention, lie in its relatively low cost, its facile and rapid adjustment and replacement, the relatively few number of moving parts, its being unaffected by atmospheric conditions or dust, and its capability of complete servicing and inspection of the friction elements without the necessity of removing the wheel with which it is cooperative in developing the braking action.

The invention possesses other objects and advantageous features, some of which, with those enumerated will be set forth in the following description of the invention's particular embodiment which is illustrated in the drawings accompanying and forming a part of the specification.

Referring to the drawings:

Fig. 3 is a side elevation taken in the direction of the arrow 3 of Fig. 1, portions of the figure being broken away to disclose the internal friction elements;

Fig. 4 is a vertical, compound sectional view, with the planes of section taken upon the lines 4—4 of Fig. 3, the direction being indicated by the arrows, and portions of the figure being broken away to better disclose portions of the structure.

Figure 1:
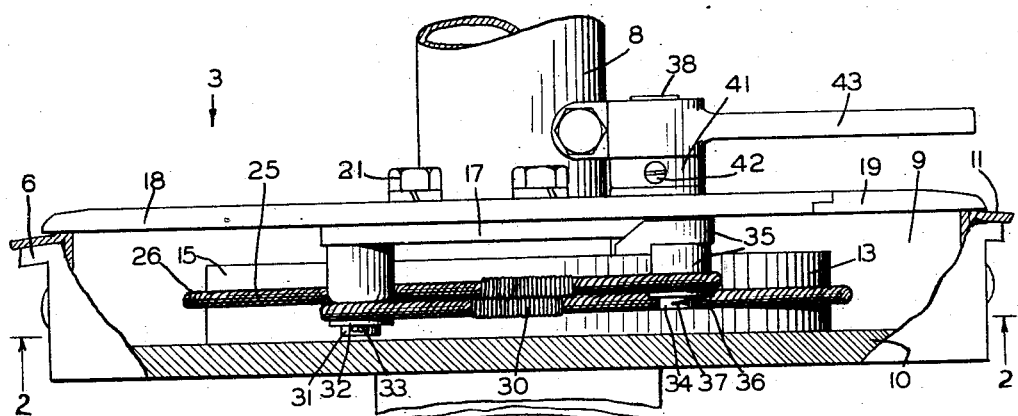
Figure 1 is a top plan view of a braking mechanism incorporating the principles of the present invention, portions being broken away to better disclose the internal mechanism, and to reduce the size of the figure.

In terms of broad inclusion, the braking mechanism of the present invention, comprises a revolubly mounted drum having a relatively stationary, flexible cable wound thereupon, with one or more complete turns. One end of the cable is secured to a suitable stationary structure, and the other end is attached to an operating arm by means of which friction is caused between the cable and the drum by moving the free end of the cable relative to the drum in such a manner as to vary the effective length thereof. Preferably both the drum and the cable are enclosed within a housing which protects the mechanism and adds an efficient streamline configuration to the wheel.

Specifically describing the invention in its most practical embodiment of which we are at present aware, it is herein shown and described as being cooperatively associated with a wheel 6 of the well known disc type, only that portion of the wheel adjacent the hub thereof, being shown. The wheel 6 contains a bushing 7 which is journalled upon a suitable axle 8 of conventional design. A recess 9 is formed in the inner face of the wheel 6, by offsetting the central portion 10 thereof from the remainder 11 of the disc, a cylindrical wall 12 joining the two portions 10 and 11. A brake drum 13 in the form of an anular flange 14 and a substantially cylindrical flange 15, is secured to the central portion 10 of the wheel 6, by means of a plurality of bolts 16 or their equivalent, passing through holes 16ᵃ in the annular flange 14 and aligned holes through the central portion 10 of the wheel 6, the parts being so arranged that the flange 15 is disposed concentrically with respect to the axis of rotation of the wheel 6. That portion of the flange 14 immediately surrounding each of the bolt holes 16ᵃ is pressed outwards, forming a depression 16ᵇ in the inner face of the flange 14, and a boss 16ᶜ in the outer face; and depressions 16ᵈ complementary to and in register with the bosses 16ᶜ are formed in the inner face of the central wheel portion 10. This feature facilitates assembly, and assures accurate concentric alignment of the drum 13 and its wheel 6. The heads of the bolts may be formed with their inner faces complementary to the depressions 16ᵇ, to insure a better seating thereof.

A bracket plate 17 is secured rigidly to the axle 8 and extends radially therefrom preferably to a position adjacent to the outer edge of the cylindrical flange 15 of the drum 13. A cover plate composed of preferably overlapping upper and lower sections 18 and 19 respectively, is secured to the bracket plate 17 by means of a plurality of studs 20 and nuts 21. Preferably the ends 22 of the studs 20, are welded or otherwise firmly attached to the bracket plate 17, and the shanks 23 of the studs 20, extend through holes 24 in the sections 18 and 19 of the cover plate, to receive the nuts 21 upon the outer ends thereof, so as to firmly and removably retain the sections 18 and 19 of the cover plate in position. The parts are so proportioned and arranged that the portions 18 and 19 of the cover plate cooperate with the cylindrical wall 12, so as to completely enclose the recess 9 within which the brake drum 13 is positioned.

The friction element cooperative with the brake drum 13, is in the form of a flexible cable 25 preferably composed of braided or twisted wire and encircling the cylindrical flange 15 of the brake drum 13 with one or a plurality of turns 26. The ends 27 and 28 of the cable 25, are passed around thimbles 29 and secured by splices 30. The thimble 29 associated with the end 27 of the cable 25, fits over a cable pin 31 which is welded or otherwise firmly attached to the bracket plate 17, the thimble 29 being positioned on the cable pin 31 by means of a washer 32 and cotter pin 33. The thimble 29 of the other end 28 of the cable 25, fits over a cable pin 34 which is welded or otherwise firmly attached to an operating arm 35, this thimble 29 being similarly positioned on its pin 34 by means of a washer 36 and cotter pin 37. The cable pins 31 and 34 are of suitable length, and the cable ends are so secured thereto relative to the plane of the drum 13, that the ends 27 and 28 of the cable 25 pass each other and extend tangentially from the drum from a common line of tangency without obstruction. The operating arm 35 is welded or otherwise firmly attached to a shaft 38 passing through a bushing 39 supported in a tube 40 which is welded or otherwise firmly attached to the bracket plate 17. The shaft 38 is prevented from moving laterally in the bushing 39 by means of a collar 41 and set screw 42 threaded therethrough. Attached to the outer end of the shaft 38 is a lever 43 of conventional design which is adjustable to the most convenient position thereon by a spline 44, for operation by cable or otherwise from the control station of the airplane. The operating arm 35 is limited in its movement laterally by the stops 45 and 46 which are welded or otherwise firmly attached to the bracket plate 17, and is urged toward brake-releasing position by a spring 47. The cable 26 is prevented from moving laterally toward the outer edge of the drum 13 by means of a cable guide 48 riveted or otherwise firmly attached to the lower section 19 of the cover plate.

Figure 2:
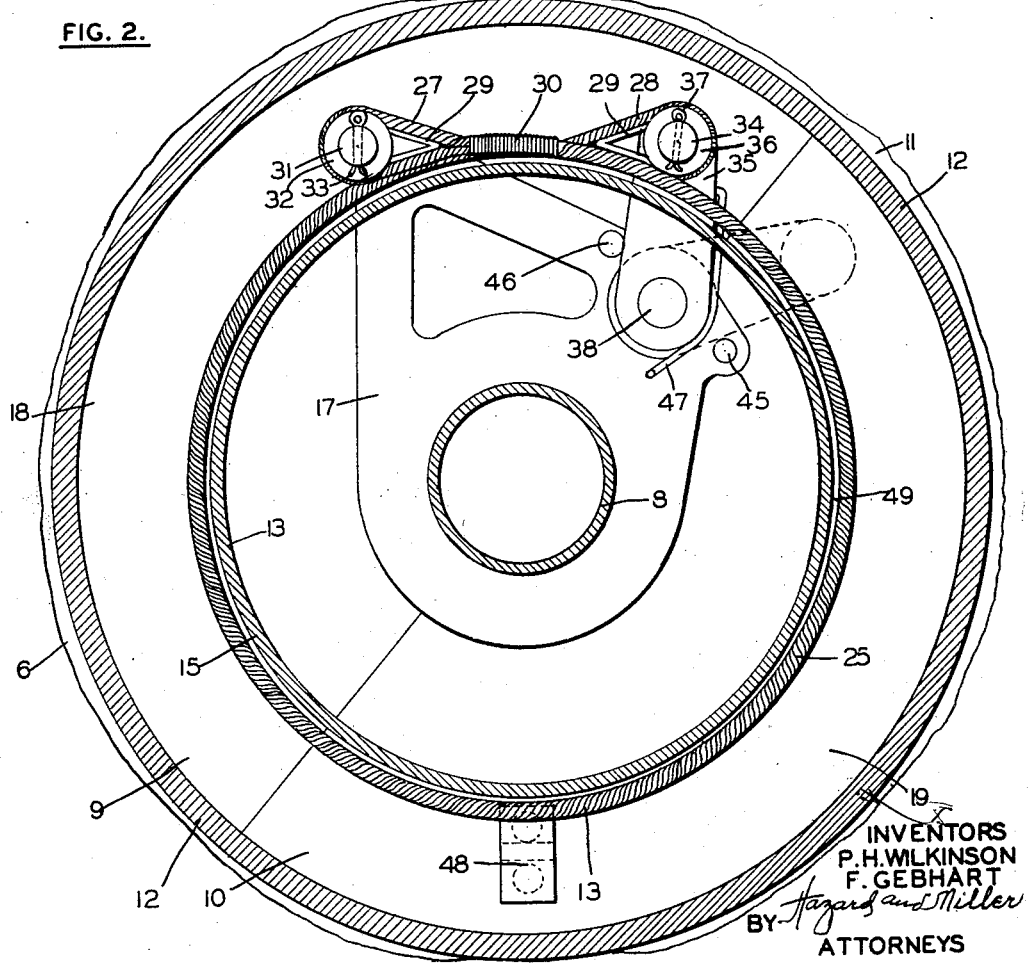
Fig. 2 is a vertical sectional view, the plane of section being taken upon the line 2—2 of Fig. 1, with the direction of view indicated by the arrow.

To develop friction resistive to rotation of the wheel 6 in respect to the axle 8, tension is imposed upon the end 28 of the cable 25, by imparting rotary movement to the shaft 38 and operating arm 35 in a clockwise direction as viewed upon Fig. 2, it being understood that the lever 43 is suitably operable by a cable or its equivalent, from the operator's station. Inasmuch as one end 27 of the cable 25 is secured to the stationary pin 31, movement of the operating arm 35 will result in a reduction in the effective diameter of the coil 26 of the cable 25, and will cause pressure to be gradually exerted by the cable 25 against the outer face 49 of the cylindrical flange 15 of the brake drum 13. When it is desired to decrease the braking action, it is necessary only to decrease the amount of tension exerted upon the cable 25, whereupon the pressure of the cable 25 against the drum 13, will be reduced by the action of the spring 47, and by reason of the natural spring in the cable 25 itself. Lateral displacement of the cable 25 at the bottom of the drum 13, is prevented by the cable guide 48.

Owing to the fact that the friction elements are completely enclosed within the recess 9 which is provided with the cover plate sections 18 and 19, the drum 13 and cable 25 may be supplied with suitable lubricant, resulting in a quietly and smoothly operating braking mechanism. Furthermore, the entire braking mechanism is composed of an absolute minimum of moving parts, each of which is of an exceedingly simple nature, and all of which are readily accessible; with the result that the cost of manufacture, installation, and maintenance, is reduced to a minimum, and servicing, inspection, and replacement may be effected with the utmost ease. However, even though the braking mechanism of the present invention is of such simple characteristics, it is capable of developing a high degree of braking efficiency, this feature being largely attributable to the fact that the cable 25 encircles the brake drum 13 with at least one full turn; with the result that equalized pressure of the cable against the drum is exerted throughout the entire periphery of the drum.

It is to be understood that the details of the invention as herein disclosed, are subject to alteration within the spirit or scope of the appended claims.

We claim:

1. A braking mechanism for an airplane comprising a stationary structure, a wheel journalled thereon, a brake drum rigid with said wheel, a stranded metal cable encircling and engaging said drum with one complete turn only, one end of said cable being carried by said stationary structure, an arm mounted for rotary movement upon said stationary structure, the other end of said cable being carried by said arm, and means for imparting rotary movement to said arm.

2. A braking mechanism for an airplane comprising a stationary structure, a wheel journalled thereon, a brake drum rigid with said wheel, a flexible wire cable encircling said drum with a single turn only, one end of said cable being carried by said stationary structure, an arm mounted for rotary movement upon said stationary structure, the other end of said cable being carried by said arm, means for imparting rotary movement to said arm, and spring means resistive to said rotary movement.

3. A braking mechanism for an airplane comprising a stationary structure, a wheel journalled thereon, a brake drum rigid with said wheel, a flexible wire cable encircling said drum, a cable pin rigid with said stationary structure and extending therefrom adjacent said drum, one end of said cable being affixed to said cable pin, an arm mounted for rotary movement on said stationary structure, a cable pin carried by said arm and extending therefrom adjacent said drum, the other end of said cable being affixed to said second mentioned cable pin, means for imparting rotary movement to said arm, and a cover plate removably secured to said stationary structure in position to enclose the space within which the drum is disposed.

4. A braking mechanism for an airplane comprising a stationary structure, a wheel journalled thereon, a brake drum rigid with said wheel, a flexible wire cable encircling and engaging said drum, a cable pin rigid with said stationary structure and extending therefrom adjacent said drum, one end of said cable being affixed to said cable pin, an arm mounted for rotary movement on said stationary structure, a cable pin carried by said arm and extending therefrom adjacent said drum, the other end of said cable being affixed to said second mentioned cable pin, means for imparting rotary movement to said arm, and a cover plate comprising a plurality of sections removably secured to said stationary structure in position to enclose the space within which the drum is disposed.

5. In combination, an axle, a wheel journalled thereupon and having a recess in one side thereof surrounding said axle, and a braking mechanism comprising a brake drum secured to said wheel within said recess, a bracket rigid with said axle, a stationary cable pin secured to said bracket and extending adjacent the outer circumference of said drum, an arm mounted for rotary movement upon said bracket and extending radially outwards beyond the drum, a cable pin carried by said arm and extending therefrom adjacent the outer circumference of the drum, a cable affixed at one end to the stationary cable pin and wrapped about the drum, the other end of said cable being carried past the stationary cable pin and secured to the other of said cable pins, and means for imparting rotary movement to said arm.

6. In combination, an axle, a wheel journalled thereupon and having a recess in one side thereof surrounding said axle, and a braking mechanism comprising a brake drum secured to said wheel within said recess, a bracket rigid with said axle, a stationary cable pin secured to said bracket and extending adjacent the outer circumference of said drum, an arm mounted for rotary movement upon said bracket and extending radially outwards beyond the drum, a cable pin carried by said arm and extending therefrom adjacent the outer circumference of the drum, a cable affixed at one end to the stationary cable pin and wrapped about the drum, the other end of said cable being carried past the stationary cable pin and secured to the other of said cable pins, means for imparting rotary movement to said arm, and a cover plate secured to said bracket and closing the outer side of said recess to enclose said drum and bracket.

7. In combination, an axle, a wheel journalled thereupon and having a recess in one side thereof surrounding said axle, and a braking mechanism comprising a brake drum secured to said wheel within said recess, a bracket rigid with said axle, a stationary cable pin secured to said bracket and extending adjacent the outer circumference of said drum, an arm mounted for rotary movement upon said bracket and extending radially outwards beyond the drum, a cable pin carried by said arm and extending therefrom adjacent the outer circumference of the drum, a cable affixed at one end to the stationary cable pin and wrapped about the drum, the other end of said cable being carried past the stationary cable pin and secured to the other of said cable pins, means for imparting rotary movement to said arm, and a cover plate comprising a plurality of sections removably secured to said bracket and closing the outer side of said recess to enclose said drum and bracket.

8. In combination, an axle, a wheel journalled thereupon and having a recess in one side thereof surrounding said axle, and a braking mechanism comprising a brake drum secured to said wheel within said recess, a bracket rigid with said axle, a stationary cable pin secured to said bracket and extending adjacent the outer circumference of said drum, an arm mounted for rotary movement upon said bracket and extending radially outwards beyond the drum, a cable pin carried by said arm and extending therefrom adjacent the outer circumference of the drum, a cable affixed at one end to the stationary cable pin and wrapped about the drum, the other end of said cable being carried past the stationary cable pin and secured to the other of said cable pins, means for imparting rotary movement to said arm, a cover plate removably secured to said bracket and closing the outer side of said recess to enclose said drum and bracket, and a guide carried by said cover plate and extending therefrom adjacent said drum to retain the cable against lateral displacement.

9. In a braking mechanism for an airplane, a rotary member, a flanged drum, and means for securing said drum to said rotary member in concentricity therewith, comprising a plurality of headed bolts, each extending through aligned holes in the drum flange and rotary member, and a boss encircling each bolt hole in the flange and seating within a complementary depression in the rotary member, said bosses being formed in one face of the flange by pressing depressions in the opposite face, and the heads of said bolts being complementary to and seating within said depressions.

10. In combination, an axle, a wheel journalled thereupon and having a recess in one side thereof surrounding said axle, and a braking mechanism comprising a brake drum secured to said wheel within said recess, a bracket rigid with said axle, a stationary cable pin secured to said bracket and extending adjacent the outer circumference of said drum, an arm mounted for rotary movement upon said bracket and extending radially outwards beyond the drum, a cable pin carried by said arm and extending therefrom adjacent the outer circumference of the drum, a cable affixed at one end to the stationary cable pin and wrapped about the drum, the other end of said cable being carried past the stationary cable pin and secured to the other of said cable pins, the points of attachment of the ends of said cable to the respective cable pins being misaligned to permit the ends of the cable to pass each other without interference, and means for imparting rotary movement to said arm.

11. A braking mechanism for an airplane comprising a stationary structure, a wheel journalled thereon, a metal brake drum rigid with said wheel, a flexible wire cable encircling said drum with one full turn only, the ends of said cable extending tangentially in opposite directions from the common line of tangency in the circumference of said drum, means normally loosening said cable to relieve its pressure against said drum, and means for tightening said cable against said drum.

In testimony whereof we have signed our names to this specification.

PAUL H. WILKINSON.
FREDERICK GEBHART.